(12) United States Patent
Lortz et al.

(10) Patent No.: US 9,032,493 B2
(45) Date of Patent: May 12, 2015

(54) CONNECTING MOBILE DEVICES, INTERNET-CONNECTED VEHICLES, AND CLOUD SERVICES

(75) Inventors: Victor B. Lortz, Beaverton, OR (US); Anand P. Rangarajan, Beaverton, OR (US); Somya Rathi, Portland, OR (US); Vijay Sarathi Kesavan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/065,840

(22) Filed: Mar. 31, 2011

(65) Prior Publication Data

US 2012/0254960 A1    Oct. 4, 2012

(51) Int. Cl.
| | | |
|---|---|---|
| *G06F 21/00* | (2013.01) | |
| *H04W 12/08* | (2009.01) | |
| *G06F 21/43* | (2013.01) | |
| *H04L 29/06* | (2006.01) | |
| *H04W 12/06* | (2009.01) | |

(52) U.S. Cl.
CPC ............ *H04W 12/08* (2013.01); *H04L 63/0823* (2013.01); *H04L 63/104* (2013.01); *H04L 63/18* (2013.01); *H04W 12/06* (2013.01); *G06F 21/43* (2013.01); *H04L 63/0492* (2013.01)

(58) Field of Classification Search
CPC ........ B60R 25/00; B60R 25/24; H04L 67/12; H04L 63/18; H04L 63/104; H04L 63/0492; H04K 2203/22; H04W 12/08; H04W 12/06; G06F 21/42
USPC .................... 726/7; 340/426; 701/1; 379/212
See application file for complete search history.

(56) References Cited

U.S. PATENT DOCUMENTS

| | | | |
|---|---|---|---|
| 6,405,033 B1* | 6/2002 | Kennedy et al. | 455/414.1 |
| 7,161,464 B2* | 1/2007 | Yuhara | 340/5.2 |
| 7,181,620 B1* | 2/2007 | Hur | 713/171 |
| 7,801,507 B2* | 9/2010 | Benco et al. | 455/410 |
| 8,222,989 B2* | 7/2012 | Ziska et al. | 340/5.1 |
| 8,258,934 B2* | 9/2012 | Filev et al. | 340/435 |
| 2002/0135466 A1* | 9/2002 | Bunyan | 340/426 |
| 2004/0185842 A1* | 9/2004 | Spaur et al. | 455/420 |

(Continued)

FOREIGN PATENT DOCUMENTS

| | | |
|---|---|---|
| CN | 101855861 A | 10/2010 |
| JP | 2007-034765 A | 2/2007 |

(Continued)

OTHER PUBLICATIONS

Katsuyuki Umezawa et al., A Study on User Authentication Infrastructure for Next Generation Telematics, Proceedings of the 2008 IEEE International Conference on Vehicular Electronics and Safety 38-44 (Sep. 22-24, 2008).*

(Continued)

*Primary Examiner* — Morshed Mehedi
*Assistant Examiner* — Sharon Lynch
(74) *Attorney, Agent, or Firm* — Forefront IP Lawgroup, PLLC

(57) ABSTRACT

A three-way trust relationship is established between a mobile device, Internet-connected vehicle system, and a cloud-based service. Access rights are granted to the mobile device from the vehicle system, such that the mobile device can securely connect to, and obtain status information and/or control the Internet-connected vehicle system, through the cloud-based service.

21 Claims, 4 Drawing Sheets

(56) References Cited

U.S. PATENT DOCUMENTS

| | | | |
|---|---|---|---|
| 2004/0210757 A1* | 10/2004 | Kogan et al. | 713/182 |
| 2005/0065678 A1* | 3/2005 | Smith et al. | 701/29 |
| 2006/0184531 A1* | 8/2006 | Russlies | 707/9 |
| 2007/0075848 A1* | 4/2007 | Pitt | 340/426.2 |
| 2007/0075849 A1* | 4/2007 | Pitt | 340/426.2 |
| 2007/0079113 A1* | 4/2007 | Kulkarni et al. | 713/150 |
| 2007/0178882 A1 | 8/2007 | Teunissen et al. | |
| 2008/0148374 A1* | 6/2008 | Spaur et al. | 726/6 |
| 2008/0150683 A1 | 6/2008 | Mikan et al. | |
| 2009/0248232 A1* | 10/2009 | Sennett et al. | 701/29 |
| 2010/0037057 A1* | 2/2010 | Shim et al. | 713/171 |
| 2010/0077446 A1* | 3/2010 | Umezawa et al. | 726/2 |
| 2010/0094996 A1* | 4/2010 | Samaha | 709/224 |
| 2010/0241857 A1* | 9/2010 | Okude et al. | 713/168 |
| 2010/0284382 A1* | 11/2010 | Stahlin et al. | 370/338 |
| 2010/0287038 A1* | 11/2010 | Copejans | 705/13 |
| 2011/0151795 A1* | 6/2011 | D'Avello et al. | 455/63.3 |
| 2011/0191581 A1* | 8/2011 | Shim et al. | 713/158 |
| 2011/0209064 A1 | 8/2011 | Jorgensen et al. | |
| 2011/0237287 A1* | 9/2011 | Klein et al. | 455/521 |
| 2011/0264916 A1* | 10/2011 | Fischer et al. | 713/175 |
| 2011/0277027 A1 | 11/2011 | Hayton et al. | |
| 2012/0060030 A1* | 3/2012 | Lamb | 713/166 |
| 2012/0062392 A1* | 3/2012 | Ferrick et al. | 340/905 |
| 2012/0100806 A1* | 4/2012 | Hall | 455/41.2 |
| 2012/0197523 A1* | 8/2012 | Kirsch | 701/426 |
| 2012/0203399 A1* | 8/2012 | Filev et al. | 701/1 |
| 2012/0219142 A1* | 8/2012 | Gould | 379/212.01 |
| 2012/0252405 A1* | 10/2012 | Lortz et al. | 455/410 |
| 2012/0297458 A1* | 11/2012 | Tom | 726/4 |

FOREIGN PATENT DOCUMENTS

| | | | |
|---|---|---|---|
| JP | 2009123059 A | 6/2009 | |
| JP | 2009135688 A | 6/2009 | |
| TW | I369112 B | 7/2012 | |
| WO | 2012/134571 A1 | 10/2012 | |

OTHER PUBLICATIONS

International Search Report and Written Opinion received for PCT Patent Application No. PCT/US2011/066800, mailed on Sep. 3, 2012, 9 pages.
Office Action received for U.S. Appl. No. 13/134,064, mailed on Jan. 14, 2013, 10 pages.
Office Action received for U.S. Appl. No. 13/134,064, mailed on Jun. 14, 2013, 9 pages.
International Preliminary Report on Patentability and Written Opinion received for PCT Application No. PCT/US2011/066800, mailed on Oct. 10, 2013, 6 pages.
Office Action received for U.S. Appl. No. 13/134,064, mailed on Aug. 1, 2014, 10 pages.
Extended European Search Report received for European Patent Application No. 11862752.0, mailed on Sep. 3, 2014, 6 pages.
Supplementary European Search Report received for European Patent Application No. 11862752.0, mailed on Sep. 19, 2014, 1 page.
Office Action received for Taiwan Patent Application No. 100148365, mailed on Apr. 22, 2014, 23 pages of Office Action including 11 page of English Translation.
Office Action received for Japanese Patent Application No. 2014-502548, mailed on Jun. 3, 2014, 6 pages of Office Action including 3 pages of English Translation.
Umezawa et al., "A Study on User Authentication Infrastructure for Telematics", The Institute of Image Information and Television Engineers, Apr. 28, 2008, pp. 133-138.
Office Action received for Korean Patent Application No. 10-2013-7025246, mailed on Nov. 26, 2014, 7 pages of English Translation and 7 pages of Korean Office Action.
Office Action received for Japanese Patent Application No. 2014-502548, mailed on Oct. 21, 2014, 3 pages of English Translation and 3 pages of Japanese Office Action.
Final Office Action received for U.S. Appl. No. 13/134,064, mailed on Dec. 12, 2014, 11 pages.
Notice of Grant received for Japanese Patent Application No. 2014-502548, mailed on Feb. 10, 2015, 3 Pages.

* cited by examiner

CONNECTING MOBILE DEVICES, INTERNET-CONNECTED VEHICLES, AND CLOUD SERVICES

BACKGROUND

The Internet has allowed users to access and use various web services. Traditionally, such access to these services was through the use of computers. However, access to the Internet has progressed to other devices, such as mobile devices, including smart phones. Technology progresses allowing other devices, appliances, and platforms to access the Internet. In particular, such a platform includes automotive vehicles.

Cloud-based services are certain Internet services available to users. In cloud-based services, computing or processing can take place at various physical and virtual servers (i.e., computing devices) that are not particularly known by a user. To the user, the cloud-based service is performed somewhere on the Internet. Where the service is physically performed, the user does not know or necessarily care to know. Cloud computing allows a device to free itself of certain processing, including accessing data and performing tasks related to the cloud-based service.

It is possible to implement applications on mobile devices that control and obtain status information from other devices through a cloud-based service. One such usage scenario is to connect a mobile device to an Internet connected vehicle through a cloud-based service.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Security issues can arise when allowing a mobile device to access information from and control an Internet-connected vehicle. Such security issues include accessing proprietary information provided by a cloud-based service to the Internet-connected vehicle; and assuring proper authority to control and access the Internet-connected vehicle.

In addition, connecting a mobile device to an Internet-connected vehicle can be inconvenient and cumbersome to a user. For example, a user may have to rely on a third party to install and activate Internet connection to a vehicle. A lengthy registration and installation process may be needed to register the vehicle with a cloud-based service. There also may be a registration procedure for multiple mobile devices. Such a registration and installation procedure may not allow the use of guest mobile devices. Guest mobile device users may temporarily use the vehicle and desire some access to and/or control of the vehicle.

Overview

Described herein are devices and methods for introducing and granting access rights to a mobile device including a smart phone, such that the mobile device can securely connect to and/or control an Internet-connected automotive system, through a cloud-based service.

Example System Environment

Figure 1:
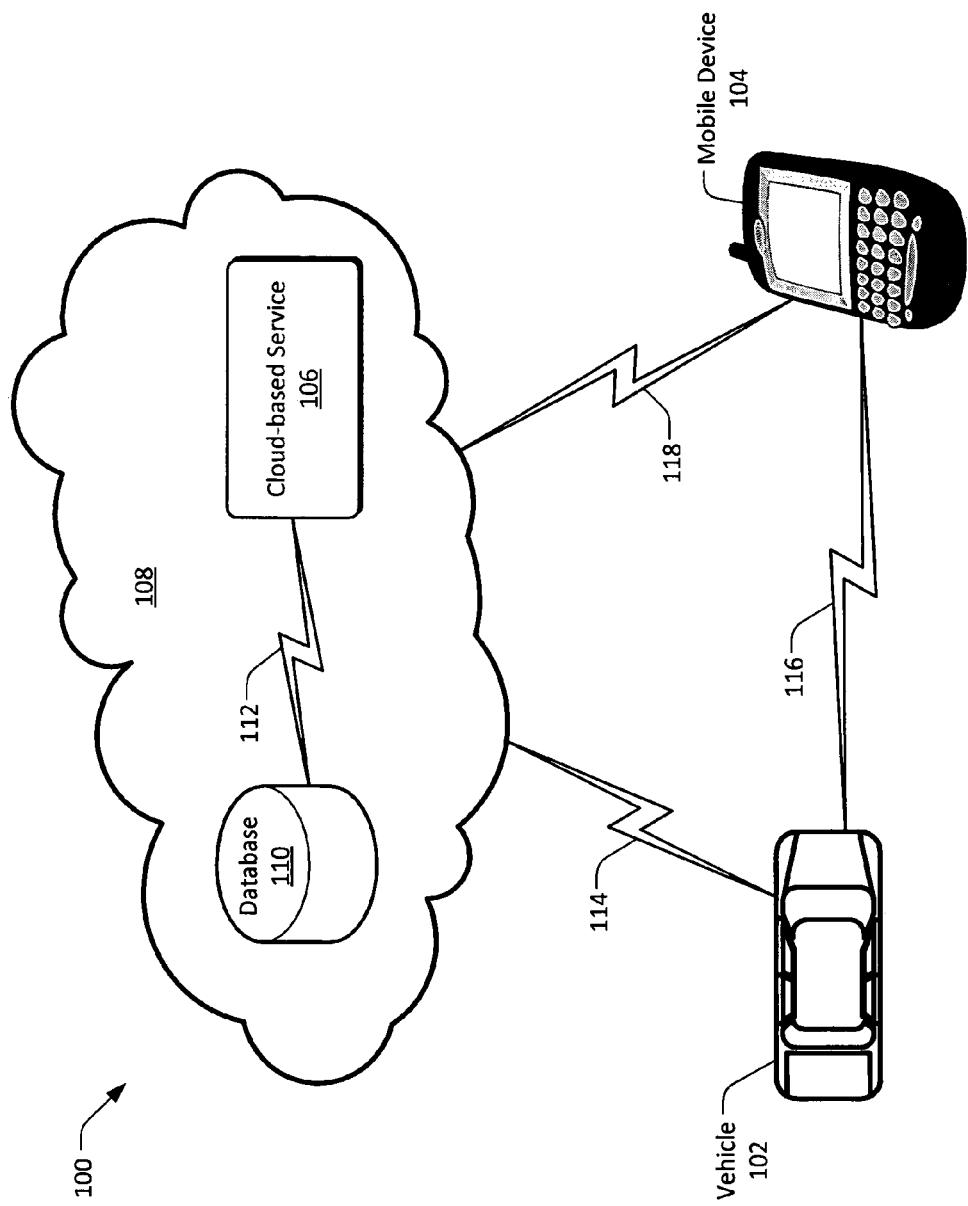
FIG. 1 is a block diagram of an example system architecture to connect a mobile device, an internet-connected vehicle, and a cloud-based service according to some implementations.

FIG. 1 illustrates a system-level overview of an exemplary system environment 100 for connecting an Internet-connected vehicle system or vehicle 102, a mobile device 104, and a cloud-based service 106. The system environment 100 may include a vehicle computing system or vehicle 102, a mobile device computing system or mobile device 104 and a cloud-based service 106. Reference to vehicle 102 herein includes a vehicle computing system and a physical automotive vehicle in which the vehicle computing system resides.

The cloud-based service 106 can be part of the Internet as represented by cloud 108. Cloud-based service 106 can be part of an example cloud computing architecture that includes a front end component (not shown) and a back end component (not shown). The front end component is seen by a client, such as the vehicle 102. In certain implementations, vehicle 102 and applications resident on vehicle 102 access the cloud-based service 106 through a user interface, such as a web browser. The back end component of the example cloud computing architecture can include various computers, services and data storage devices.

A database 110 is accessed by cloud-based service 106 through a connection 112. The database 110 can be an authentication and authorization database. Examples of information stored in database 110 include data specific to vehicle 102, such as "Client ID" of the mobile device 104; "role" of the mobile device 104 (i.e., Owner or Guest); and "Credential Information" allowing the mobile device 104 to access the cloud-based service 106.

In certain implementations, a digital certificate for vehicle 102 can be issued at the time of, or subsequently after, manufacturing of the vehicle 102 to establish a trust relationship between the vehicle 102 and cloud-based service 106. The digital certificate can be stored in secure memory of the vehicle 102. In addition, another digital certificate can be issued for the cloud-based service 106, allowing the vehicle 102 to identify and trust the cloud-based service 106. Therefore, the digital certificates can be used to protect communication between the vehicle 102 and cloud-based service 106. It is to be understood that credential types besides certificates can be used. For example, a shared secret can be used between the vehicle 102 and the cloud-based service 106. In certain implementations, the vehicle 102 can use a smart card such as a SIM for authentication.

In order to access the cloud-based service 106, the vehicle 102 can include information as to a uniform resource locator or URL of the cloud-based service 106. A connection 114 between the vehicle 102 and cloud-based service 106 can be through various technologies, including International Mobile Telecommunications standard or cellular 3G/4G (or a future variant), WiFi (i.e., IEEE 802.11), or WiMax (i.e., IEEE 802.16) access. Such access may be through a wireless 3G/4G modem or other wireless interface. A secure connection 114 can be established using a variety of different protocols. An example protocol is Extensible Messaging and Presence Protocol or has XMPP; however, it is to be understood that other protocols can be used. XMPP can be an efficient protocol which can also support the secure sockets layer (SSL) or transport layer security (TLS) protocol. SSL and TLS protocols can provide communication privacy and authentication based on the digital certificates of vehicle 102 and cloud-based service 106.

A local communication or a connection 116 can be established between the vehicle 102 and mobile device 104. The connection 116 can include near field communication or NFC for very short range communication, and Bluetooth and/or WiFi for longer range communication. To assure security and establish a trust relationship between the vehicle 102 and mobile device 104, there may be a condition to have the mobile device 104 to be physically in vehicle 102.

The mobile device 104 may include a setup application used to establish a preliminary connection with the vehicle 102. The setup application may be preinstalled or downloaded into the mobile device 104. A local pairing may be performed between the vehicle 102 and mobile device 104. For example, such a pairing may be implemented using a WiFi Protected Setup (WPS) or NFC connection handover.

During establishment of the local connection, an out of band channel is implemented in order to establish security between the vehicle 102 and mobile device 104. Exchanging secret information through the out of band channel can prevent other mobile devices (i.e., attackers) within the range of the local connection from connecting to the vehicle 102. As an example, such out of band methods may include one or more of the following: NFC touch (i.e., exchange of NFC data through an NFC interface); bar code identification (e.g., the mobile device 104 reading a 2D bar code that is displayed on a screen/display of the vehicle 102); accelerometer "bump"; a time-limited push-button configuration; and/or a personal identifier number or PIN entered by the user.

To establish trust relationship between the vehicle 102 and mobile device 104, certain out of band data is transferred from the vehicle 102 to the mobile device 104 through use of one or more of the out of band methods. Out of band data may allow the mobile device 104 to connect with vehicle 102, and determine the cloud-based service 106 that supports the vehicle 102. In addition, the out of band data may establish that the mobile device 104 has actually read the out of band data, thus verifying the mobile device 104. Out of band data may include a secret for the purpose of setting up an initial trust between the vehicle 102 and mobile device 104.

Once the mobile device 104 receives the out of band data, the mobile device 104 may receive data as to the configuration of wireless communication of vehicle 102. Configuration information may include whether the vehicle 102 has a built in WiFi access point, if the vehicle 102 supports direct peer to peer WiFi, etc. For example, if the mobile device 104 finds out details of the wireless connection to the vehicle 102, a port number can be received by the mobile device 104 through the out of band channel (data) as to set up services for mobile devices of the vehicle 102. In addition, other data may be received by the mobile device 104, such as, for example, a software version number. Other data may allow the mobile device 104 to determine if the mobile device 104 can support the introduction/connection to the vehicle 102.

Once out of band exchange is performed, the mobile device 104 may connect to the vehicle 102 using a local wireless network link such as, for example, Bluetooth or WiFi. After the local wireless connection is established, the mobile device 104 may receive an authenticated and encrypted payload from the vehicle 104 that contains configuration data including the URL of the cloud-based service 106, a vehicle 102 identifier, and a client credential (e.g., client identifier and shared secret or client certificate) for future use with the cloud-based service 106. The client credential may be used to establish access rights of the mobile device 104 to the cloud-based service 106.

As an example, access rights of the mobile device 104 with the cloud-based service 106 can be established by the following. The vehicle 102 determines access rights by presenting various options through a display/touch screen or voice interface (i.e., microphone and speakers). The vehicle 102 may provide a prompt on a display of the vehicle 102, requesting the owner (i.e., user having owner's rights) of the vehicle 102 to verify that the owner is adding the mobile device 104. For example, an owner may be able to add a guest user and a guest user mobile device. A guest user and a guest user mobile device may have limited access rights and privileges, or full ownership rights and privileges to the vehicle 102.

Biometric methods, such as face or voice recognition, may be used to determine a user's identity (e.g., owner of vehicle 102), verify ownership rights and authority to assign access rights to the mobile device 104. If ownership of vehicle 102 cannot be conclusively established by the vehicle 102, access rights of the mobile device 104 may be limited to an acceptable low-risk default level or limited set of access rights. In certain implementations, a camera of the vehicle 102 can perform face recognition to verify ownership of the vehicle 102. In other implementations, voice recognition may be used to verify ownership of the vehicle 102. If the user is not recognized as an owner of vehicle 102, a security policy may be implemented to prevent the mobile device 104 from accessing the vehicle 102 or provide the mobile device 104 with a limited set of rights and privileges. For example, a limited set of rights and privileges may be allowing access to a local WiFi connection of the vehicle 102, and preventing turning on/off the alarm of the vehicle 102.

The mobile device 104 may send proof to the cloud-based service 106 that the mobile device 104 has received a secret (e.g., the authenticated and encrypted payload) from the vehicle 102 and provide any identifying information that may be needed. The mobile device 104 may provide identity, credential, and access rights over a secure channel (i.e., connection 118) to the cloud-based service 106. The identity or identifying information provided by mobile device 104 may include a readable name that identifies the user or phone by name. In certain implementations, a certificate may be given to the mobile device 104 to identify the mobile device 104. In other implementations, a symmetric secret key may be given to the mobile device 104 to identify the mobile device 104. Thereafter, the mobile device 104 can authenticate with the cloud-based service 106 and gain remote access to the vehicle 102 and/or associated data over the Internet through the cloud-based service 106. Furthermore, the mobile device 104 may verify trust of the cloud-based service 106 by comparing a "server certificate" with a domain name in the URL as provided by the vehicle 102. Trust between the cloud-based service 106 and the mobile device 104 may use the same protocols and mechanisms as a conventional browser-based secure website implementing e-commerce security.

The exchange of the secret (e.g., the authenticated and encrypted payload) over the out of band channel between the vehicle 102 and the mobile device 104 can prove to the vehicle 102 that the mobile device 104 knows the secret. In certain implementations, the secret is not sent by itself, but is used as an input to a cryptographic hash function which is used to prove that the mobile device 104 is the device that received that out of band data (whether through the use of NFC, bar code, etc.). The vehicle 102 may check and verify the hash, and provide the mobile device 104 configuration information that the mobile device 104 can use to connect to the cloud-based service 106. Such configuration information may include the URL of the cloud-based service 106 and an identifier of the mobile device 104. In certain cases, a secret is included which the mobile device 104 uses to log on to the cloud-based service 106.

Once trust is established with the mobile device 104, a connection 118 between the mobile device 104 and the cloud-based service 106 may now occur. The connection 118 may be one of various wireless connections including cellular connections that include 3G/4G (or future variants), and WiFi/WiMax connections.

Therefore, by establishing a secured trust between the vehicle 102, mobile device 104 and cloud service 106, information between and control of the three entities is protected. For example, the use of secrets and the passing of such secrets between the vehicle 102, mobile device 104 and cloud service 106 may prevent phishing attacks such as when the mobile device 104 tries to access what is believed to be the cloud-based service 106. Although a user of the mobile device 104 believes that they are accessing the proper URL, they may be redirected to an attacker's server. However, through the use of a local wireless introduction between the vehicle 102 and mobile device 104, stronger passwords can be exchanged and an exchange of secrets can be implemented.

Once the three-way trust is established between the vehicle 102, mobile device 104, and cloud-based service 106, the mobile device 104 can allow a user to access functionality of the vehicle 102. For example, an application in the mobile device 104 can be activated, and the application may connect to the cloud-based service 106. Information received from the vehicle 102 during the pairing process, can be used by the application to securely log on to the cloud-based service 106. In certain cases, the mobile device 104 provides an ID to the cloud-based service 106 that associates the mobile device 104 to the vehicle 102.

The cloud-based service 106 allows the mobile device to log in, and the application running on the mobile device 104 may invoke functions on the cloud-based service 106 to instruct the vehicle 102 to perform certain tasks/operations. The tasks/operations may be conveyed through communication 114. Examples of tasks and operations may include, as discussed above, turning on/off an alarm of the vehicle 102. Other tasks may include opening and closing locks of the vehicle 102. In an example scenario, an alarm may be triggered at the vehicle 102, and cameras of the vehicle 102 may record video around the vehicle 102. The video may then be uploaded from the vehicle 102 to the cloud-based service 106 for viewing by the mobile device 104. In addition, a short message service or SMS message may be sent to the mobile device 104. The SMS message may include a link that allows the mobile device 104 to connect to cloud-based service 106 and view the video of what happened that set off the alarm (e.g., the vehicle 102 is being towed, was damage, etc.). Other tasks/operations may include remotely starting the vehicle 102, determining the amount of fuel in the vehicle 102, determining the temperature in the vehicle 102, and locating the vehicle 102 using a global positioning system or GPS.

Example Internet-Connected Vehicle System

Figure 2:
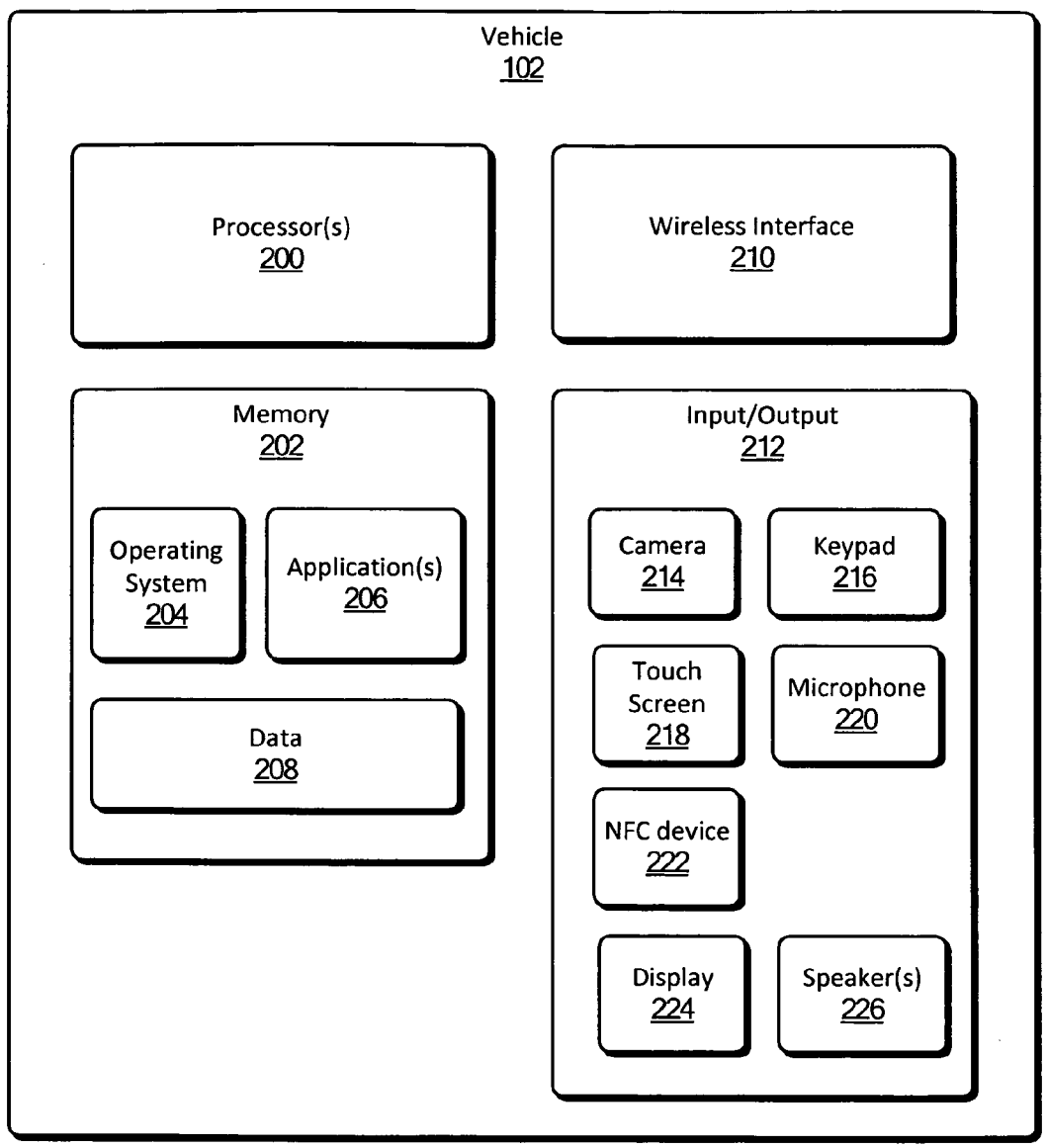
FIG. 2 is a block diagram of an example Internet-connected vehicle system that connects to a mobile device and cloud-based service according to some implementations.

FIG. 2 shows an example Internet-connected vehicle system 102. Vehicle 102 includes one or more processors, processor(s) 200. Processor(s) 200 may be a single processing unit or a number of processing units, all of which may include single or multiple computing units or multiple cores. The processor(s) 200 may be implemented as one or more microprocessors, microcomputers, microcontrollers, digital signal has processors, central processing units, state machines, logic circuitries, and/or any devices that manipulate signals based on operational instructions. Among other capabilities, the processor(s) 200 may be configured to fetch and execute computer-readable instructions or processor-accessible instructions stored in a memory 202 or other computer-readable storage media.

Memory 202 is an example of computer-readable storage media for storing instructions which are executed by the processor(s) 200 to perform the various functions described above. For example, memory 202 may generally include both volatile memory and non-volatile memory (e.g., RAM, ROM, or the like). Memory 202 may be referred to as memory or computer-readable storage media herein. Memory 202 is capable of storing computer-readable, processor-executable program instructions as computer program code that may be executed by the processor(s) 200 as a particular machine configured for carrying out the operations and functions described in the implementations herein.

Memory 202 may include an operating system 204, and may store application(s) 206. The operating system 204 may be one of various known and future operating systems implemented for personal computers, vehicle systems, etc. The applications(s) 206 may include preconfigured/installed and downloadable applications. A web browser may be included in the operating system 204 or be part of application(s) 206. In addition, memory 202 can include data 208. As discussed above, examples of data 208 include "Client ID" of the mobile device 104, "Role" of the mobile device 104, and "Credential Information" and a digital certificate issued at the time of manufacturing (or subsequently) to the vehicle 102.

The Internet-connected vehicle system 102 may include communication interface(s), and particularly a wireless interface 210, for exchanging data with other devices and networks. The wireless interface 210 may include WiFi, WiMax, NFC, Bluetooth, 3G/4G (or a future variant) cellular communications, etc.

Internet-connected vehicle system 102 includes input/output components/devices or input/output 212. In this example, input/output 212 includes a camera 214, a keypad 216, touch screen 218 and a microphone 220 to receive input, including biometric information (e.g., face, voice, fingerprint, retinal, etc.). Furthermore, input/output 212 may include an NFC device 222 used to perform out of band local pairing between the vehicle 102 and mobile device 104. NFC device 222 may be hardware that functions as a reader, and includes an identifying "sticker." NFC device 222 can particularly be used for local pairing between the mobile device 104 and the vehicle 102 as discussed above. Input/output 212 may include output components/devices, such as a display 224 and audio speaker(s) 226.

The example Internet-connected vehicle system 102 described herein is merely an example that is suitable for some implementations and is not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example Mobile Device System

Figure 3:
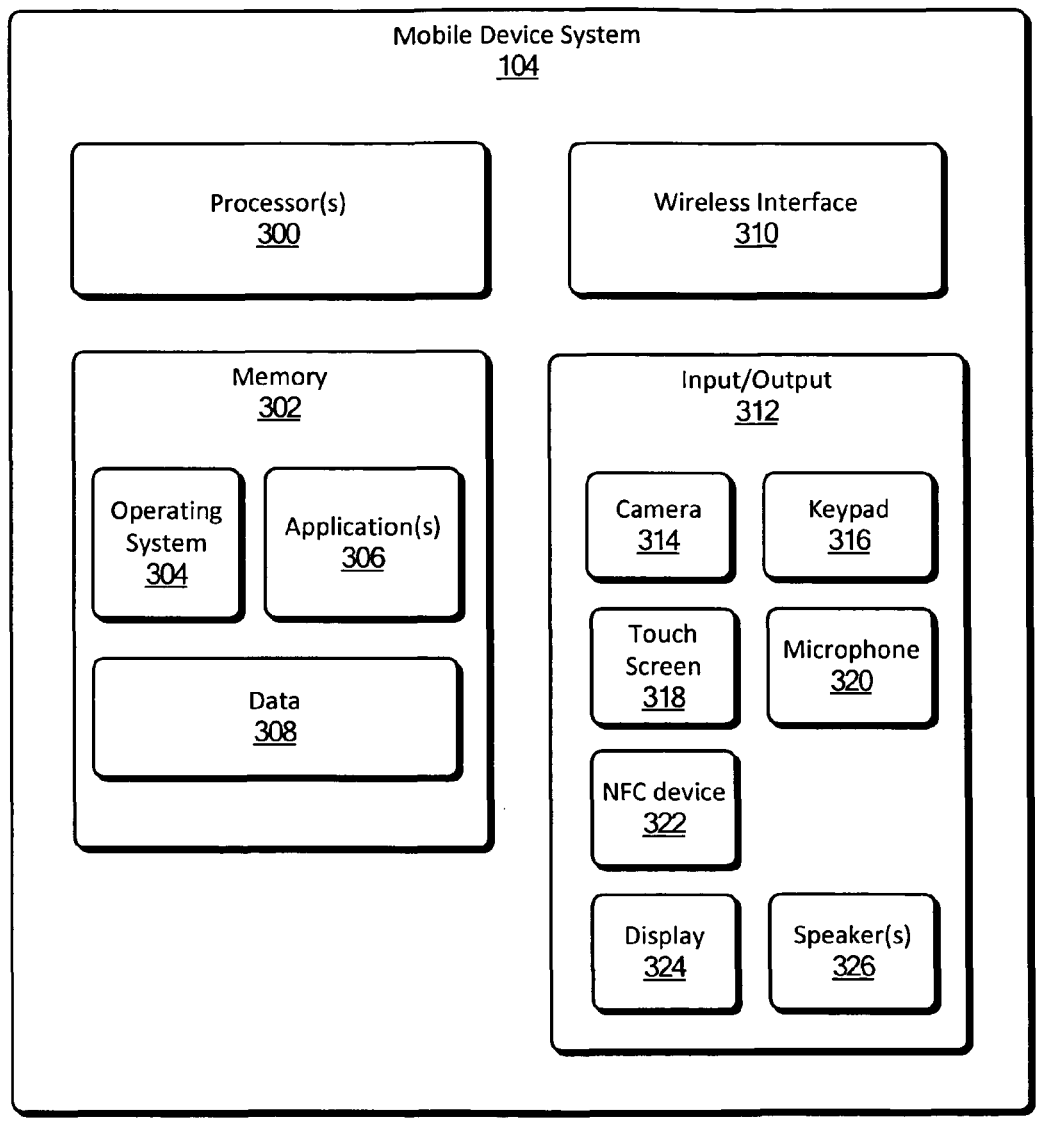
FIG. 3 is a block diagram of an example mobile device that connects to internet-connected vehicle system and cloud-based service according to some implementations.

FIG. 3 shows an example mobile device 104. The mobile device 104 includes one or more processors, processor(s) 300. Processor(s) 300 may be a single processing unit or a number of processing units, all of which may include single or multiple computing units or multiple cores. The processor(s) 300 may be implemented as one or more microprocessors, microcomputers, microcontrollers, digital signal processors, central processing units, state machines, logic circuitries, and/or any devices that manipulate signals based on operational instructions. Among other capabilities, the processor(s) 300 may be configured to fetch and execute computer-readable instructions or processor-accessible instructions stored in a memory 302 or other computer-readable storage media.

Memory 302 is an example of computer-readable storage media for storing instructions which are executed by the processor(s) 300 to perform the various functions described above. For example, memory 302 may generally include both volatile memory and non-volatile memory (e.g., RAM, ROM, or the like). Memory 302 may be referred to as memory or computer-readable storage media herein. Memory 302 is capable of storing computer-readable, processor-executable program instructions as computer program code that may be executed by the processor(s) 300 as a particular machine configured for carrying out the operations and functions described in the implementations herein.

Memory 302 may include an operating system 304. Operating system 304 may be one of various known and future operating systems implemented for mobile devices. The applications(s) 306 may include preconfigured/installed and downloadable applications. Application(s) 306 may include an application to contact and connect with the cloud-based service 106 and the setup application used to establish a preliminary connection with the vehicle 102. A web browser may be included in the operating system 304 or be part of application(s) 306. Furthermore, data 308 may be stored in memory 302. As discussed above, examples of data 308 include "Client ID" of the mobile device 104, "Role" of the mobile device 104, and "Credential Information" and a digital certificate issued at the time of manufacturing (or subsequently) to the vehicle 102.

The mobile device system 300 may include communication interface(s), and particularly a wireless interface 310, for exchanging data with other devices and networks. The wireless interface 310 may include WiFi, WiMax, NFC, Bluetooth, 3G/4G (or a future variant) cellular communications, etc.

Mobile device system 300 includes input/output components/devices or input/output 312. In this example, input/output 312 includes a camera 314, a keypad 316, a touch screen 318 and a microphone 320 to receive input, including biometric information (e.g., face, voice, fingerprint, retinal, etc. recognition). Furthermore, in certain implementations, input/output 312 may include a NFC device 322 used to perform out of band local pairing between the vehicle 102 and mobile device 104. NFC device 322 may be hardware that functions as a reader, and includes an identifying "sticker." NFC device 322 may particularly be used for local pairing (e.g., with NFC device 222) between the mobile device 104 and the vehicle 102 as discussed above. Input/output 312 may include output components/devices, such as a display 324 and audio speaker(s) 326.

The example mobile device 104 described herein is merely an example that is suitable for some implementations and is not intended to suggest any limitation as to the scope of use or functionality of the environments, architectures and frameworks that may implement the processes, components and features described herein.

Generally, any of the functions described with reference to the figures may be implemented using software, hardware (e.g., fixed logic circuitry) or a combination of these implementations. Program code can be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example Process

Figure 4:
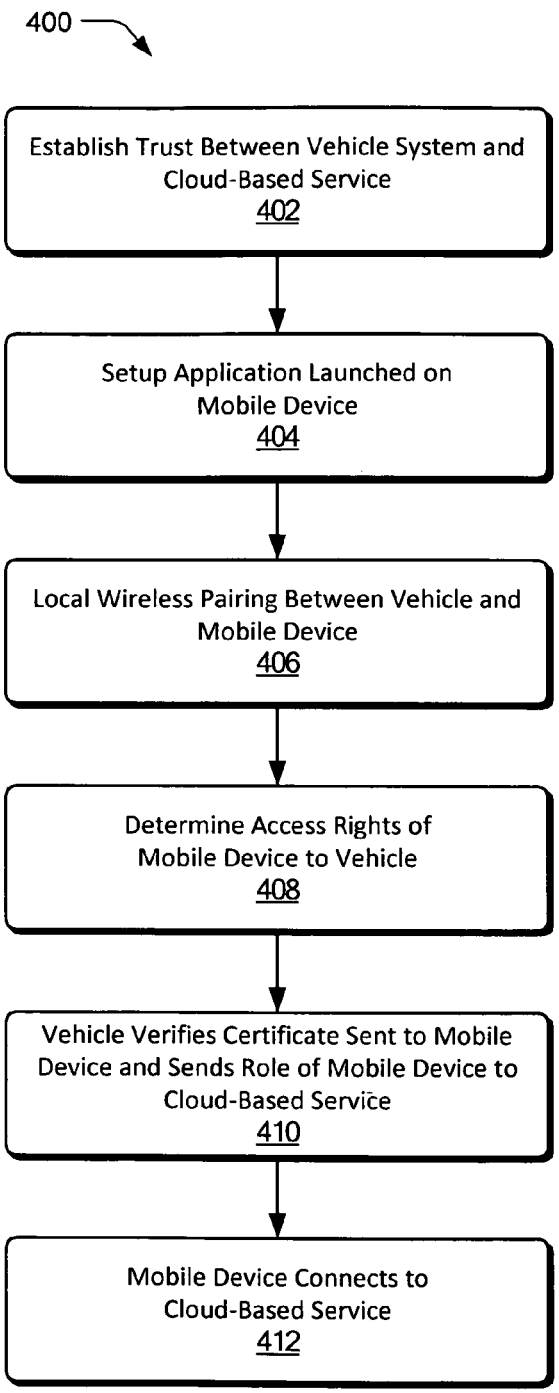
FIG. 4 is a flow chart for performing and establishing a three way trust relationship between a vehicle, cloud-based service, and a mobile device according to some implementations.

FIG. 4 shows a flow chart for an exemplary process 400 for establishing a three way trust relationship between a vehicle, cloud-based service, and a mobile device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, establishing trust between a vehicle or vehicle system, and a cloud-based service is performed. Establishing the trust relationship may be part of a vehicle manufacturing process. Establishing the trust relationship may include digital certificates and hardware protection mechanisms implementing a secure boot process with software attestation and hardware-protected key storage, implemented by the vehicle system to maintain integrity of the trust relationship.

At block 404, launching of a setup application is performed by the mobile device. The setup application may be preinstalled or downloaded into the mobile device. In certain implementations, the setup application uses a preconfigured Internet Protocol or IP address, and a port number to connect to a setup service of the vehicle system. Furthermore, the setup application may send a certificate to request the setup service. In particular cases, if the service setup is accepted by the vehicle system, the user may be prompted to place the mobile device next to a reader (e.g., NFC reader) of the vehicle system.

At block 406, local wireless pairing is performed between the vehicle system and the mobile device. In order to assure security of data communicated by the pairing, out of band methods as described above, may be implemented. Such methods include NFC touch, infrared, 2-D barcode, accelerometer "bump", time-limited push-button Configuration, and PIN number entry by the user. For example, if NFC touch is implemented, the vehicle reads NFC data from the mobile device. The NFC data may include: a mobile device's "friendly name" and a hash (e.g., 16 byte hash) of the mobile device's certificate request. The vehicle system may verify that the hash matches a certificate request sent by a currently-connected mobile device. If the hash does not match, the vehicle system ignores the NFC data and optionally shows a dialog warning that it is unable to continue with the setup operation. If the hash matches, the process may continue. Alternatively, the NFC data may include a symmetric key used to authenticate and encrypt subsequent communication for credential establishment between the vehicle system and the mobile device over the local wireless network link. In certain implementations, the vehicle system sends a symmetric key and mobile device identifier to the mobile device and to the cloud-based system.

Once the out of band exchange is performed, connection between the mobile device and the vehicle may be performed using a local wireless network link such as Bluetooth or WiFi. After the local wireless connection is established, the mobile device receives an authenticated and encrypted payload from the vehicle that includes configuration data including the URL of the cloud-based service, a vehicle identifier, and a client credential for future use with the cloud-based service.

At block 408, determining access rights for the mobile device is performed. Access rights are directed to the cloud-based service providing control and services to the vehicle. Determining access rights may involve identifying who is providing the access rights. In other words, a determination can be made if an owner or a person with authority is providing the access rights. Biometric methods (e.g., face or voice recognition) may be used to determine the user that is requesting access rights for the mobile device. If the user is authorized, a desired role (e.g., owner, guest, cancel) for the mobile device may be selected from a menu provided by the vehicle. For example, if the authorized user chooses "owner" or "guest", the vehicle may sign a certificate and send the signed certificate to the mobile device. The vehicle may then send a client to client (C2C) uniform resource locator (URL) to the mobile device. The C2C URL may include an https:prefix, and a client-side certificate may be used to access this URL.

At block 410, verification is performed that a certificate was sent to the mobile device, and the role of the mobile device is sent to the cloud-based service. In certain implementations, the vehicle computes a hash of the certificate (or public key of the certificate) sent to the mobile device and sends the hash along with the selected role of the mobile device to the cloud-based service. The cloud-based service can add the client certificate hash and associated role to its authentication and authorization database.

At block 412, a connection is provided between the mobile device and cloud-based service. In certain implementations, the mobile device through a web browser connects to the C2C URL of the cloud-based service provider and provides the certificate for authorization. The cloud-based service then enables the mobile device based on the role given to the mobile device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the systems described could be configured as communication devices, computing devices, and other electronic devices.

What is claimed is:

1. A method performed by a mobile device, of establishing a trust relationship between the mobile device, a vehicle system, and a cloud-based service comprising:
    performing an out of band exchange of data between the mobile device and the vehicle system to exchange data used to establish a first trust relationship;
    determining access rights of the mobile device to the cloud-based service that supports the vehicle system by accessing a database storing information defining the role of the mobile device as guest or owner and data specific to the vehicle system; and
    establishing a second trust relationship between the mobile device and cloud-based service based on data provided by the vehicle system received by the mobile device during the performing of the out of band exchange including the vehicle system sending a symmetric key and mobile device identifier to the mobile device and to the cloud-based service, wherein a pre-existing trust relationship between the vehicle system and the cloud-based service includes a digital certificate for the vehicle system and another digital certificate for the cloud-based service, wherein the digital certificates for the vehicle system is built-in during a vehicle manufacturing process.

2. The method of claim 1 wherein the digital certificate for the cloud-based service identifies the cloud-based service as trusted by the vehicle.

3. The method of claim 1 wherein the performing out of band exchange of data is performed using one or more of the following: NFC touch, infrared, 2-D barcode, accelerometer bump, time-limited push-button configuration, and/or PIN number entry.

4. The method of claim 1 wherein the data includes an authenticated and encrypted payload.

5. The method of claim 1 wherein the accessing rights includes determining vehicle ownership status of a user.

6. The method of claim 5 wherein the determining vehicle ownership status includes using biometric information to determine if the user is an owner.

7. The method of claim 5 wherein the accessing rights is defined by the following roles: owner or guest.

8. The method of claim 5 wherein if the determining vehicle ownership status is not determined, setting access rights to a predetermined default level.

9. The method of claim 1 wherein the accessing rights includes providing a role of the mobile device for the vehicle to the cloud-based service.

10. The method of claim 1 wherein establishing the second trust relationship between the mobile device and the cloud-based service based on the data provided by the vehicle system includes an exchange of signed certificates between the mobile device and the cloud-based service.

11. A mobile device comprising:
    one or more processors;
    memory configured to the one or more processors, having instructions to:
        perform an initial startup to connect to a vehicle system;
        perform an out of band exchange of data between the mobile device and the vehicle system including the vehicle system sending a symmetric key and mobile device identifier to the mobile device and to a cloud-based service to establish a trust relationship with the vehicle system and the mobile device;

determine access rights as to the mobile device to the cloud-based service that supports the vehicle system by accessing a database storing information defining the role of the mobile device as guest or owner and data specific to the vehicle system, wherein the vehicle system and the cloud-based service have a pre-existing trust relationship that includes digital certificates that are built-in during a vehicle manufacturing process, wherein the digital certificates include a separate digital certificate for the vehicle system and the cloud-based service; and establish a second trust relationship between the mobile device and the cloud-based service using data that was exchanged during the out of band exchange of data.

12. The mobile device of claim 11 wherein the memory includes an application to perform the initial startup.

13. The mobile device of claim 11 wherein the memory stores secured data used to establish the trust relationship between the vehicle system and the mobile device and the second trust relationship between the mobile device and the cloud-based service.

14. The mobile device of claim 11 wherein the access rights are determined from biometric information obtained by the vehicle system as to ownership of the vehicle system.

15. The mobile device of claim 11 further comprising a first wireless interface local connection configured to the one or more processors and memory to perform the out of band exchange of data, and a second wireless interface to exchange other data with the vehicle system.

16. The mobile device of claim 11 further comprising a cellular wireless interface to connect the mobile device with the cloud-based system.

17. One or more non-transitory computer-readable media having stored thereon computer executable instructions that, when executed, perform a method comprising:

starting an initial exchange with a vehicle system;

performing an out of band exchange of data between a mobile device and the vehicle system including the vehicle system sending a symmetric key and mobile device identifier to the mobile device and to a cloud-based service in order to establish a trust relationship between the mobile device and the vehicle system;

receiving access rights at the mobile device to the cloud-based service that controls the vehicle system upon accessing, at the cloud-based service, a database storing information defining the role of the mobile device as guest or owner and data specific to the vehicle system, wherein a pre-existing trust relationship between the vehicle system and the cloud-based service includes a digital certificate for the vehicle system and another digital certificate for the cloud-based service, wherein the digital certificates for the vehicle system is built-in during a vehicle manufacturing process;

and establishing a second trust relationship with the mobile device and the cloud-based service based on data received during the out of band exchange of data.

18. The computer-readable media of claim 17 wherein the performing the out of band exchange comprises part of a local pairing of the mobile device and the vehicle system.

19. The computer-readable media of claim 17 further comprising sending and receiving certificates used to establish the trust relationship between the vehicle system and the mobile device and the second trust relationship between the mobile device and the cloud-based service.

20. The computer-readable media of claim 17 further comprising sending and receiving a symmetric key used to establish the trust relationship between the vehicle system and the mobile device and the second trust relationship between the mobile device and the cloud-based service.

21. The computer-readable media of claim 17 further comprising providing a role of the mobile device to the cloud-based service.

* * * * *